Patented Sept. 13, 1927.

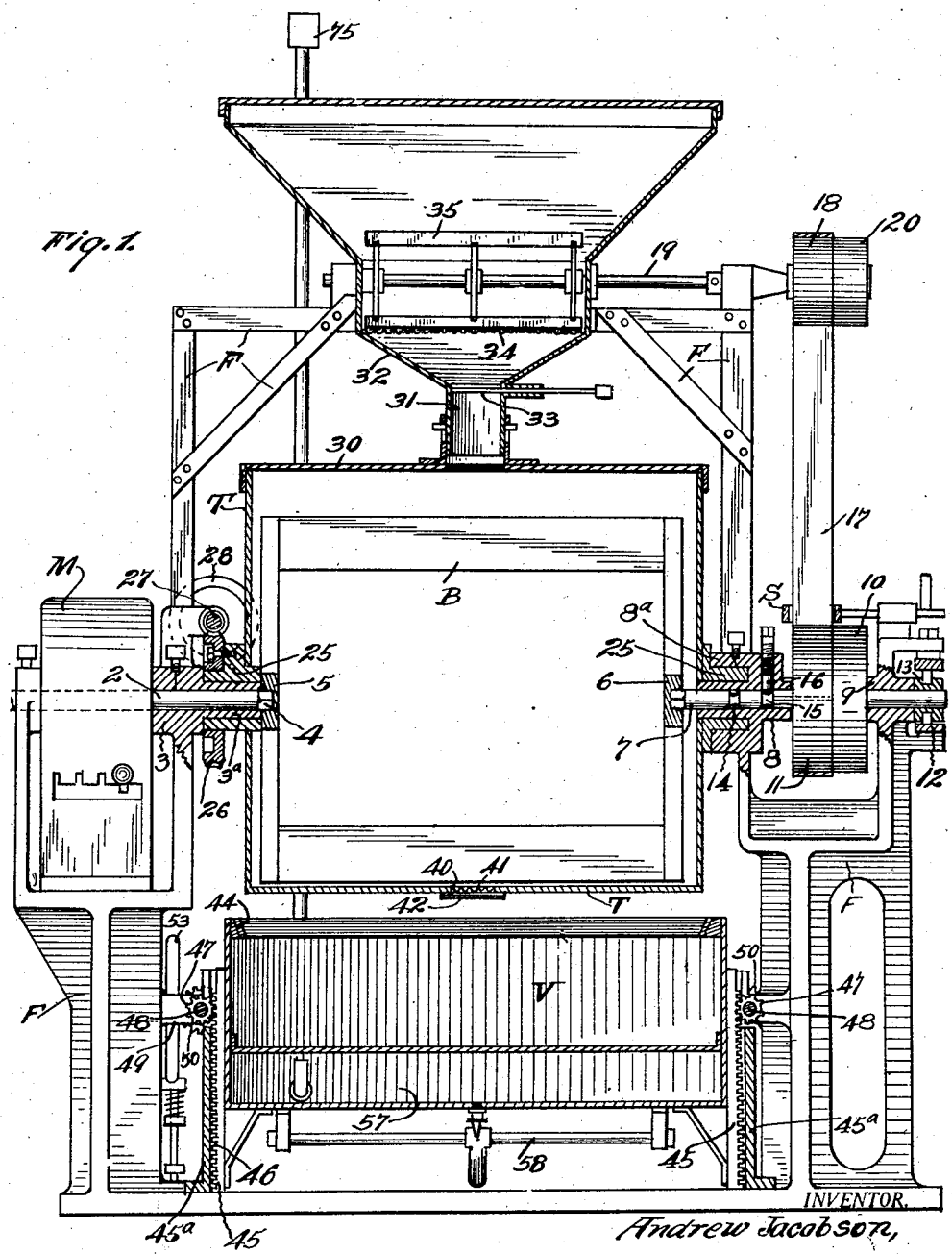

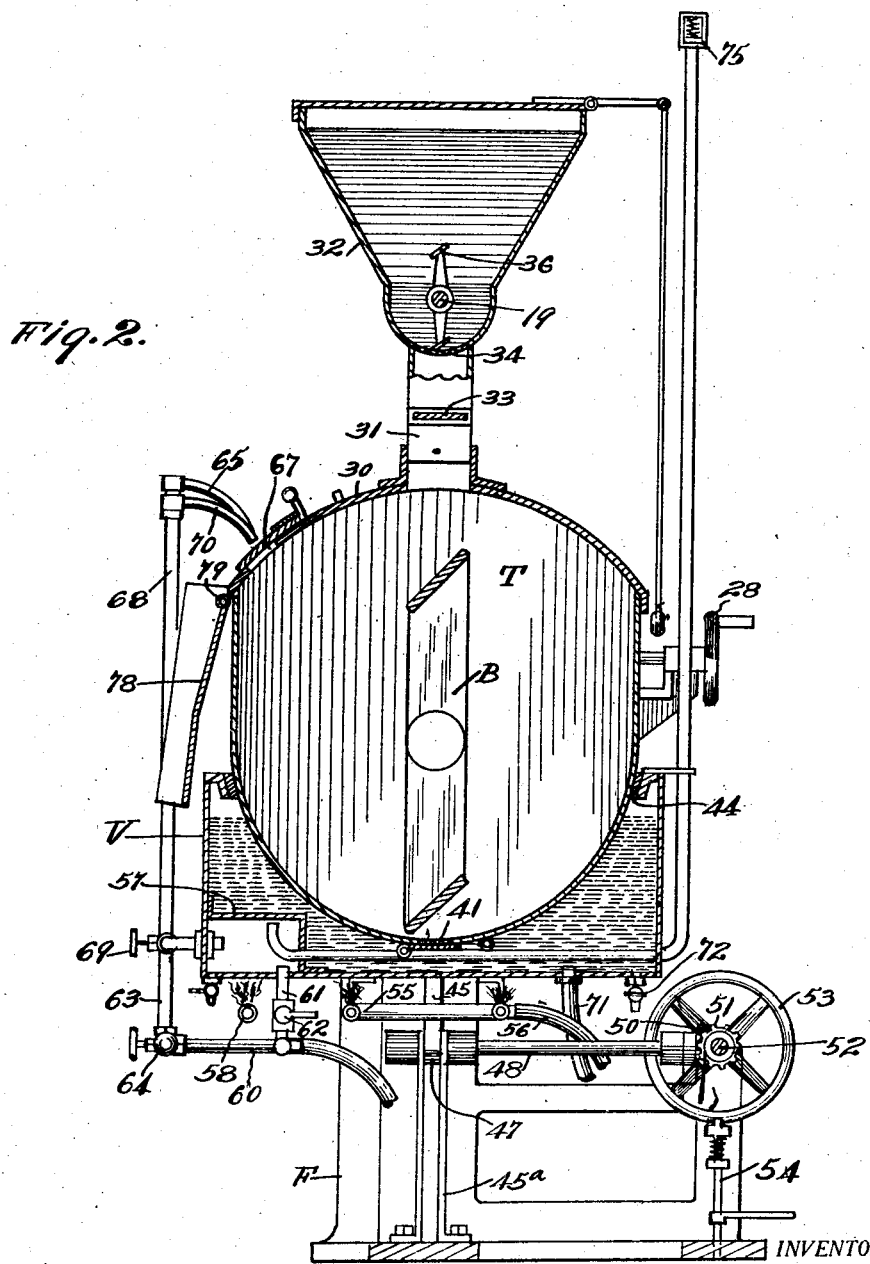

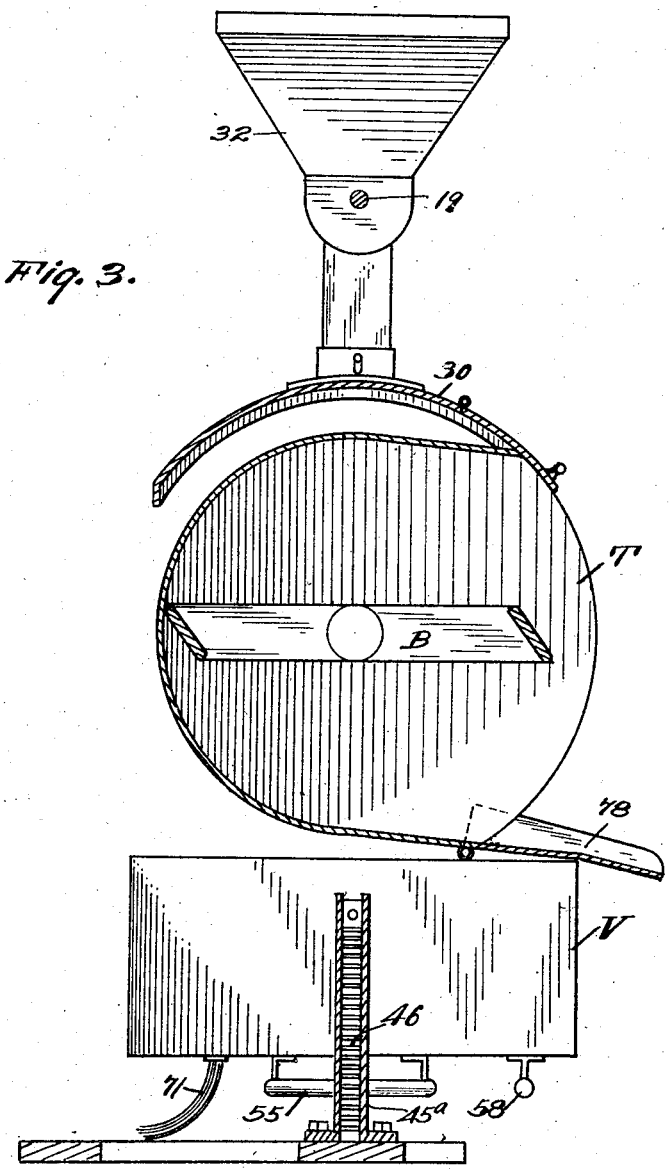

1,642,445

UNITED STATES PATENT OFFICE.

ANDREW JACOBSON, OF LOS ANGELES, CALIFORNIA.

COMBINED COOKER AND MIXER.

Application filed January 13, 1926. Serial No. 81,057.

This invention relates to food preparing apparatus and more especially to a machine for general commercial, institutional and domestic use in the mixing of dough or other various batters, soups, or other dry or wet substances.

An object of the invention is to provide a machine mixer and cooker of considerable capacity, of substantial structure and practical and effective operation for the mixing of dough compounds or other desired food substances. A further object is to provide for the ready heating or quick cooling of preparations in the course of treatment. And a further object is to provide a combined batch mixer and "double boiler" cooker.

An additional object is to provide for the ready discharge of the treated batch or preparation from the machine.

Another object is to provide for the ready interchange of one or another of various types of beaters, stirrers, mixers, whippers or agitators from a set adapted for use, severally, in the machine.

Also, it is an object to provide a heating or cooling vessel adapted to be easily and quickly shifted to and from an effective position with respect to a tiltable "tank" so that the latter may be operated at will independently of the vessel; an object being to disassociate the circulating means from the tank so as to avoid unnecessarily added parts whose weight adds to the operating resistance and increase complications of parts, and cost of manufacture thereof.

More objects and advantages will be made manifest in the following specification of apparatus, illustrated herewith, incorporating an embodiment of the invention; it being understood that modifications, variations and adaptations may be resorted to within the spirit and principle of the invention as it is here claimed.

Figure 1 is a longitudinal, vertical section of the machine; the water circulating vessel being lowered.

Figure 2 is a transverse, vertical section; the water vessel being raised, as in effective position.

Figure 3 is a vertical cross-section of the tank in discharging position.

The machine comprises a suitable, stout frame-work F upon which all of the parts are mounted as an organized unit thus enabling erecting, storing, shipping and installing as a complete structure free from extraneous and overhead supports. In other words the apparatus is wholly self-contained.

On one side of the machine is a motor and change speed gear plant M having a driven spindle 2 projecting from a bearing 3 and presenting a horn 4 to detachably receive and drive the complementary socket-hub 5 of one of a set of variously formed, rotative mixers, beaters or the like; one being indicated at B. The opposite end of such element B has a socket-hub 6 to receive the near end of and drive a shaft 7 which is slidable and journaled in bearings 8—9 between which is a pulley 10 loose on the shaft 7. Next to the pulley 10 is a twin pulley 11 splined on the shaft 7.

The shaft 7 is shiftable endwise by suitable means, as a lever 12 engaging a collar 13 pinned on the shaft, which has grooves 14—15 to receive a spring-bolt 16 whose function is to latch the shaft rotatively in either inner or outer position.

When in inner position the shaft interlocks with the element B and as this is rotated power is transmitted by it to the splined pulley 11 and from this power may be transmitted by a shiftable belt 17 to a pulley 18 tight on a countershaft 19, which has a loose pulley 20 opposite to the loose pulley 10.

The various beaters B (which are designed to operate upon various substances) are each adapted to pass into a receiver or what is, by the trade, called a "tank" T which is sufficiently longer than the beater, from hub 5 to hub 6, to permit the latter to be shifted endwise onto the horn 4 while the shaft 7 is in outer position. As soon as the beater B has been hung on the horn 4 the shaft 7 is pushed in to interlock in the socket-hub 6, after which the motor plant M may be started and the shaft 7 driven by the beater.

The tank T has coaxial trunnion sleeves 25 fitting upon hollow trunnions $3^a$ and $8^a$ which form parts of bearings 3—8. To tilt the tank T on its trunnions it is provided with a gear 26 engaged by a worm 27 which may be turned at will by a hand wheel 28, or otherwise.

The tank is open at the top and is closeable by a cover 30 which is arched on the axis of the trunnions 3ª—8ª and vertically movable along a spout 31 located at the bottom of a sifter hopper 32. This hopper has a gate 33 below a screen 34 over which sweeps a paddle device 35. This device is mounted upon the shaft 19. Therefore, if flour or other material is poured into the hopper it will be sifted past the paddle, which can be rotated at will by throwing the belt shifters to shift the belt onto the tight pulleys 11—17, while the beater B is being rotated to effect a mix of the batch in the tank T. The sifter can be cut out of operation at any time by merely throwing the belt 19 over to the loose pulleys, operation of the beater continuing as may be desired for mixing.

The bottom of the tank T has a clean-out hole 40, screened at 41 and having a movable closure 42.

To apply heat to the mixer to facilitate preparation of some kinds of batches, and also for the purpose of enabling the cooking of foods, as mush or soups, in the tank, I provide a vessel V having an open top which closely conforms to the horizontal section of the tank T, which here has a semicylindrical bottom.

The vessel V is adapted to be raised from a lower position, clear of the tank, to an upper position to encompass the bottom, the sides and the ends of the tank. When so raised a tight fit or joint is made between the tank and the mouth of the vessel by a gasket 44. Various means may be adopted to raise or lower the vessel. In the present case it has end legs 45, movable in fixed guides 45ª, with rack faces 46 meshing with pinions 47 on shafts 48 which turn in bearings 49. These shafts extend rearward and have bevel gears 50 meshing with complementary gears 51 on a back shaft 52. This shaft has a wheel 53 for operating purposes and it may be locked by a bolt 54 to hold the parts after the vessel has been raised to position (Fig. 2) up close to the bottom of the tank T. This gear mechanism causes an even upward lift at each end of the vessel.

Attached to the bottom of the vessel is burner 55 served with fuel by a flexible connection 56.

In the vessel is a chamber 57 having a separate burner 58.

A cold water supply pipe 60 has a branch 61, with a valve 62, to chamber 57 and has a line 63, with a valve 64, to a nozzle 65 for discharging cold fresh water into the tank through a capped hole 67. From the chamber 57 a hot water pipe 68, having a valve 69, extends up and has a nozzle 70 to supply hot water to the tank. The nozzles are turnable out of the way when not needed to supply water to the tank.

After the vessel has been raised to embrace the tank, cold water is run into the vessel from a pipe 71. If a chilling action is desired the burners 55 are not lighted and cold circulation is accomplished by leading the water out of outlet 72, to a return pump if desired. For heating or cooking contents of the tank the burners 55 are lighted and the water in the vessel is heated to requisite temperature.

The service chamber 57 is heated, as required, to high temperature independently of the water in the vessel. A safety valve 75 allows for blow off at a predetermined pressure in the high temperature chamber.

To facilitate unloading of the tilted tank (Fig. 3) I provide an apron 78 hinged at 79 to the front lip of the mouth of the tank. When the tank is to be emptied the apron is extended nearly horizontally to the lip of the tank and the batch or fluid substance is run off of the apron.

The invention claimed is:

1. A frame having spaced standards, a mixing tank hung upon and between the standards and having clearance therefrom at its ends, a water vessel open at its top and disposed between said standards to be moved up around the tank when in upright position; the ends of the vessel moving up into the clearance, a heating burner attached to the boiler and moving therewith, and means for raising and lowering the vessel and the burner.

2. A combined mixer and cooker including a mixing tank, a water vessel, and means for raising the vessel to effective position under the tank; said vessel having a hot water service chamber provided with a means to serve the mixing tank and having an individual heating burner for the chamber.

3. A combined mixer and cooker having a tank with a mixing device, means for operating the device, a water vessel carrying a heating burner and being arranged under the tank, and means to supply hot water from the vessel to the mixer.

4. A combined mixer and cooker having a horizontally disposed tank with a mixing device, means for operating the device, a water vessel and a heater therefor, means for supplying hot water from the vessel to the mixer, means for moving the vessel to a position up under the mixer tank to make effective thereon hot or cold water in the vessel, and means for supplying water to the vessel irrespective of its position.

ANDREW JACOBSON.